(12) United States Patent
Knopik et al.

(10) Patent No.: US 7,400,256 B2
(45) Date of Patent: Jul. 15, 2008

(54) CHILL COOLER STORAGE AND SELECTION SYSTEM

(75) Inventors: Garry P. Knopik, Wichita, KS (US); Daniel W. Linke, Grand Island, NE (US); Randall S. Cooper, Canton, KS (US); Bruce C. Winegar, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 120 days.

(21) Appl. No.: 10/878,634

(22) Filed: Jun. 28, 2004

(65) Prior Publication Data
US 2005/0029076 A1 Feb. 10, 2005

Related U.S. Application Data

(63) Continuation-in-part of application No. 11/290,131, filed on Nov. 30, 2005, which is a continuation of application No. 10/704,408, filed on Nov. 7, 2003, now Pat. No. 6,975,233, which is a continuation of application No. 10/000,965, filed on Nov. 1, 2001, now Pat. No. 6,724,309.

(60) Provisional application No. 60/483,142, filed on Jun. 27, 2003, provisional application No. 60/245,891, filed on Nov. 3, 2000.

(51) Int. Cl.
*G08B 13/14* (2006.01)

(52) U.S. Cl. ............... 340/573.1; 340/573.3; 340/572.8

(58) Field of Classification Search ............. 340/572.1, 340/572.4, 572.8, 573.1, 573.3; 700/89, 700/116, 225; 62/64, 375, 416, 419, 63; 452/173
See application file for complete search history.

(56) References Cited

U.S. PATENT DOCUMENTS

| 1,395,333 A | 11/1921 | Bayerdorffer |
| 1,441,433 A | 1/1923 | Kisner |
| 1,956,974 A | 5/1934 | Bayerdorffer |
| 2,084,668 A | 6/1937 | Brooks |

(Continued)

FOREIGN PATENT DOCUMENTS

WO      WO 93/22907      11/1993

(Continued)

OTHER PUBLICATIONS

European Search Report (3pgs), Apr. 4, 2004.
International Search Report of PCT/US01/47284 mailed Nov. 5, 2002, (1 pg).

*Primary Examiner*—Van T. Trieu

(57) ABSTRACT

A system and method for storing and selecting animal carcasses within a cooler. A storage area has at least one storage loop forming a continuous loop upon which carcasses may circulate. A feed rail leads to the storage area. A loop entry rail branches from the feed rail onto each storage loop. A removal rail intersects each storage loop and leads to an exit rail. Each carcass may have an identification tag. Readers read the tag and a processor and database store and process information associated with the tag. Carcasses enter the storage area via the feed rail and are routed onto the loop entry rail of the storage loop having the greatest available capacity. When carcasses meeting specific criteria are desired, the database is searched and the processor causes the appropriate carcasses to circulate to the removal rails. The carcasses exit the storage loops onto the removal rails.

27 Claims, 5 Drawing Sheets

U.S. PATENT DOCUMENTS

| | | | |
|---|---|---|---|
| 2,163,016 A | 6/1939 | Barker | |
| 2,341,608 A | 2/1944 | Gey | |
| 3,511,370 A * | 5/1970 | Taylor | 209/592 |
| 3,803,801 A | 4/1974 | Barth | |
| 3,952,438 A | 4/1976 | Propst et al. | |
| 4,155,886 A | 5/1979 | DeGoler | |
| 4,214,490 A | 7/1980 | Chizek | |
| 4,228,685 A | 10/1980 | Wallace et al. | |
| 4,280,813 A | 7/1981 | DeGoler | |
| 4,313,271 A | 2/1982 | Bauer | |
| 4,499,680 A | 2/1985 | Coburn | |
| 4,512,096 A | 4/1985 | Heidecker | |
| 4,597,495 A | 7/1986 | Knosby | |
| 4,706,073 A | 11/1987 | Vila Masot | |
| 4,838,036 A * | 6/1989 | Norrie | 62/63 |
| 4,865,044 A | 9/1989 | Wallace et al. | |
| 4,909,250 A | 3/1990 | Smith | |
| 4,914,843 A | 4/1990 | DeWoskin | |
| 5,324,940 A | 6/1994 | Ekstrom | |
| 5,469,170 A | 11/1995 | Mariani | |
| 5,478,990 A | 12/1995 | Montanari et al. | |
| 5,498,202 A | 3/1996 | Vande Berg | |
| 5,781,112 A | 7/1998 | Shymko et al. | |
| 5,853,320 A * | 12/1998 | Wathes et al. | 452/88 |
| 5,865,293 A * | 2/1999 | Napadow | 198/495 |
| 5,869,341 A | 2/1999 | Woodaman | |
| 5,964,656 A | 10/1999 | Lawler, Jr. | |
| 5,973,600 A | 10/1999 | Mosher, Jr. | |
| 6,104,966 A * | 8/2000 | Haagensen | 700/116 |
| 6,196,912 B1 * | 3/2001 | Lawler et al. | 452/173 |
| 6,231,435 B1 | 5/2001 | Pilger | |
| 6,236,319 B1 | 5/2001 | Pitzer et al. | |
| 6,266,973 B1 * | 7/2001 | Salmons | 62/416 |
| 6,452,497 B1 | 9/2002 | Finlayson | |
| 6,545,604 B1 | 4/2003 | Dando et al. | |
| 6,724,309 B2 | 4/2004 | Grose et al. | |
| 6,742,309 B2 | 6/2004 | Stewart et al. | 52/79.5 |
| 6,859,672 B2 * | 2/2005 | Roberts et al. | 700/89 |
| 6,975,233 B2 | 12/2005 | Grose et al. | 340/573.1 |

FOREIGN PATENT DOCUMENTS

| | | |
|---|---|---|
| WO | WO 96/39534 | 12/1996 |
| WO | WO 00/13515 | 3/2000 |
| WO | WO 02/47485 | 6/2002 |

* cited by examiner

CHILL COOLER STORAGE AND SELECTION SYSTEM

CROSS-REFERENCE TO RELATED APPLICATION(S)

This application claims benefit of U.S. Provisional Application No. 60/483,142, filed on Jun. 27, 2003, and is a Continuation-in-Part of U.S. patent application Ser. No. 11/290,131, filed on Nov. 30, 2005, which is a Continuation of U.S. patent application Ser. No. 10/704,408, filed on Nov. 7, 2003, issued as U.S. Pat. No. 6,975,233 on Dec. 13, 2005, which is a Continuation of U.S. patent application Ser. No. 10/000,965, filed on Nov. 1, 2001, issued as U.S. Pat. No. 6,724,309 on Apr. 20, 2004, which claims priority to U.S. Patent Application No. 60/245,891 filed Nov. 3, 2000.

FIELD OF THE INVENTION

The invention relates to a system and method for storing animal carcasses within a cooler. More specifically, the invention relates to a system and method for storing and selecting an animal carcass within a cooler.

BACKGROUND OF THE INVENTION

During commercial meat production in an animal processing facility, a carcass is typically subjected to a number of different procedures. An animal is first stunned and bled and the hide is removed from the resulting carcass. Throughout this specification, the term "carcass" will be used to refer to the animal body or portion of an animal body after the animal is stunned and bled. Electrical stimulation may be used to facilitate bleeding. The carcass is then prewashed and may be subjected to an electrical stimulation process. The full animal carcass is typically split into sides (i.e., two approximately equal halves) depending on its species, size, and the intended purpose for the carcass. The carcass is subjected to steam pasteurization, typically after being split. The carcass is then inspected, weighed and washed. These processes typically take place in an area of the animal processing facility called the kill floor 2 (see FIG. 1). After these processes have taken place, the carcass is sent to a cooler 4 to be chilled, sorted, and stored until being sent to the fabrication area 6 for further processing. The carcass may be subjected to additional electrical stimulation before being sent to the cooler.

As shown in FIG. 2, during the processing of the carcass 8, the carcass is attached to a trolley 10, gambrel or shackle (hereinafter referred to as a "trolley") at an early point along the meat processing line. Typically, the rail 16 runs from the kill floor 2 through the cooler 4 to the fabrication area 6. The carcass 8, which is attached to the trolley 10, may thus be moved along the rail 16 to different areas within the animal processing facility.

As shown in FIG. 1, the cooler 4 typically includes an entry 25, a regrade/test area 30, a storage area 35, a staging area 40, and an exit 45. Carcasses travel on a feed rail 50 from the kill floor 2 through the entry 25 and into the regrade/test area 30 of the cooler 4. In the regrade/test area 30, the feed rail 50 branches into parallel rails, one rail serving as an *E-coli* test rail 55, another rail serving as a regrade rail 60, and the third rail serving as the continuation of the feed rail 50. The *E-coli* test rail 55 and the regrade rail 60 rejoin the feed rail 50 before leaving the regrade/test area 30. Multiple rails have been used for these purposes.

Carcasses exit the regrade/test area 30 and enter the storage area 35 via the feed rail 50. The feed rail 50 branches off into numerous parallel storage rails 65 once the feed rail 50 reaches the storage area 35 (see FIG. 1). The parallel storage rails 65 allow the carcasses to be sorted according to various criteria such as, for example, weight, rib eye area, projected meat yield, grade, marbling score, and projected subprimal weight. For example, all 800 pound carcasses could be sorted onto the first storage rail 65 while all 900 and 1000 pound carcasses could be sorted onto the second and third storage rails 65, respectively. Carcasses leave their respective storage rails 65 in a first in, first out (FIFO) basis.

While parallel storage rails 65 allow sorting of carcasses according to various criteria, they present two drawbacks. First, using parallel storage rails 65 results in an inflexible system because each carcass on the storage rail 65 may only exit the storage rail 65 according to a FIFO basis. Thus, selection for processing of specific individual carcasses off of a storage rail 65 is difficult.

Second, use of parallel storage rails 65 results in inefficient utilization of the storage area 35. For example, the storage area 35 may have five storage rails 65, each storage rail 65 being dedicated to one of classes A through E (these classes are used for example only and are not intended to represent any true class) and each storage rail 65 having a storage capacity of 100 carcasses. During a typical processing period, 20 class A carcasses may be waiting to enter the storage area 35. However, the storage area 35 may already contain 100 class A carcasses, 55 class B carcasses, 20 class C carcasses, 85 class D carcasses and 40 class E carcasses. Thus, although the storage space of the storage area 35 is only 60 percent utilized, the 20 class A carcasses cannot enter the storage area 35 because the class A carcass storage rail 65 is already at capacity.

There is a need in the art for a system and method for transporting, storing and selecting carcasses that allow for the efficient utilization of the storage area. There is also a need in the art for a system and method for transporting, storing and selecting carcasses within a storage area that facilitate flexibility in selecting for processing any individual carcass.

BRIEF SUMMARY OF THE INVENTION

The present invention provides a system and method for storing and selecting animal carcasses within a cooler.

The system includes a storage area having storage loops forming a track or continuous loop for circulating carcasses. Carcasses enter the storage area via a feed path or rail. As the feed rail enters the storage area, loop entry rails branch off of the feed rail, with the feed rail eventually terminating as a final loop entry rail. Each loop entry rail intersects a point on a storage loop. At another point on each storage loop, a removal rail intersects the storage loop. Each removal rail merges into an exit rail before the exit rail leaves the storage area for the staging area.

As a carcass travels along the feed rail within the storage area, the carcass is routed to the storage loop having the greatest available capacity.

Each carcass may be associated with a readable identification tag. The identification tag carries an identification code. Readers may be provided for reading the identification tag as the carcass travels along the rail.

Thus, the method of the present invention may be as follows. As a carcass is routed to a storage loop in the storage area, it is routed from of the feed rail and onto the loop entry rail leading to the storage loop. The carcass is held at the loop entry rail until an opening on the storage loop coincides with the intersection between the loop entry rail and the storage loop. The carcass is routed onto the storage loop. The carcass is circulated past a reader that reads the identification tag associated with the carcass. The identification code from the identification tag is sent to the processor and database that track which carcasses are on which storage loop. When a carcass meeting specific criteria is desired, the criteria are entered into the processor. The processor causes the storage loops to circulate the appropriate carcass or carcasses to the intersections between the storage loops and the removal rails. The appropriate carcasses exit the storage loops onto the removal rails. The carcasses travel from the removal rails onto the exit rail, leaving the storage area for the staging area.

Embodiments of the invention may be used for meat production of any type of animal, including all age classes of bovine, porcine, ovine, and poultry animals.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regraded as illustrative in nature and not restrictive.

DETAILED DESCRIPTION

Figure 1:
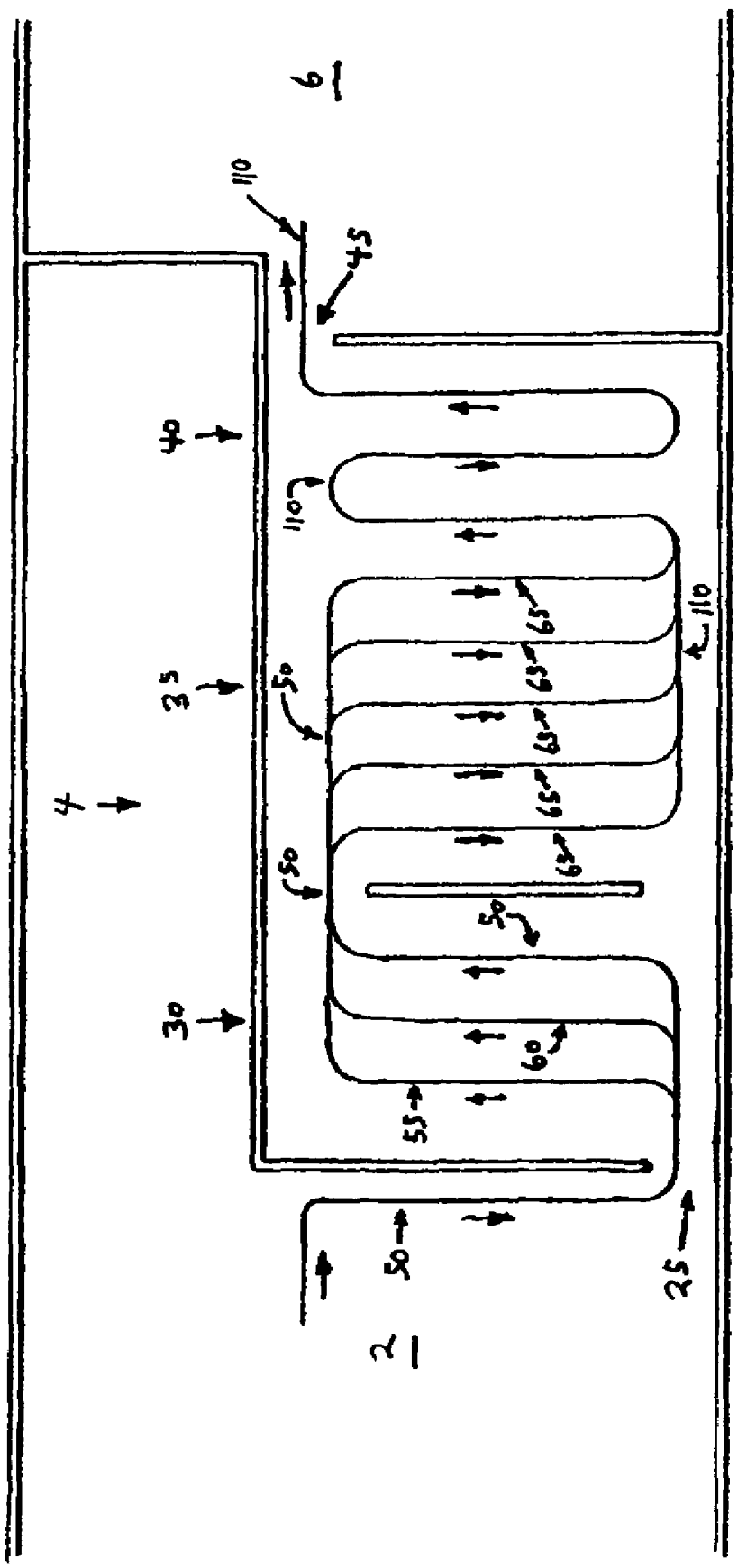
FIG. 1 is a schematic plan view of a carcass conveying and sorting system within a cooler, the system employing parallel storage rails according to the prior art.
Figure 2:
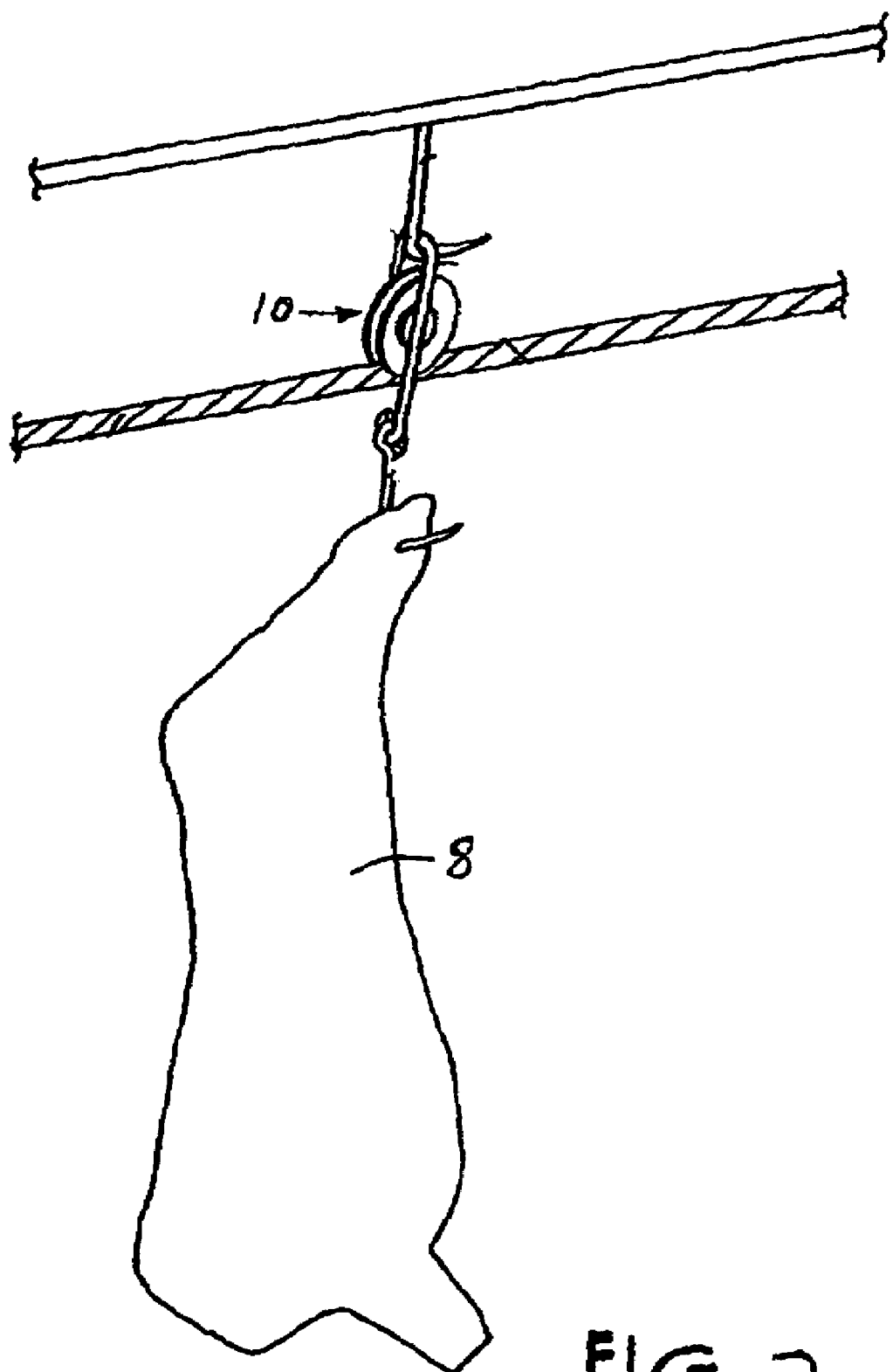
FIG. 2 is a side view of a carcass suspended from a trolley that is moving along a rail routed through an animal processing facility according to the prior art.
Figure 3:
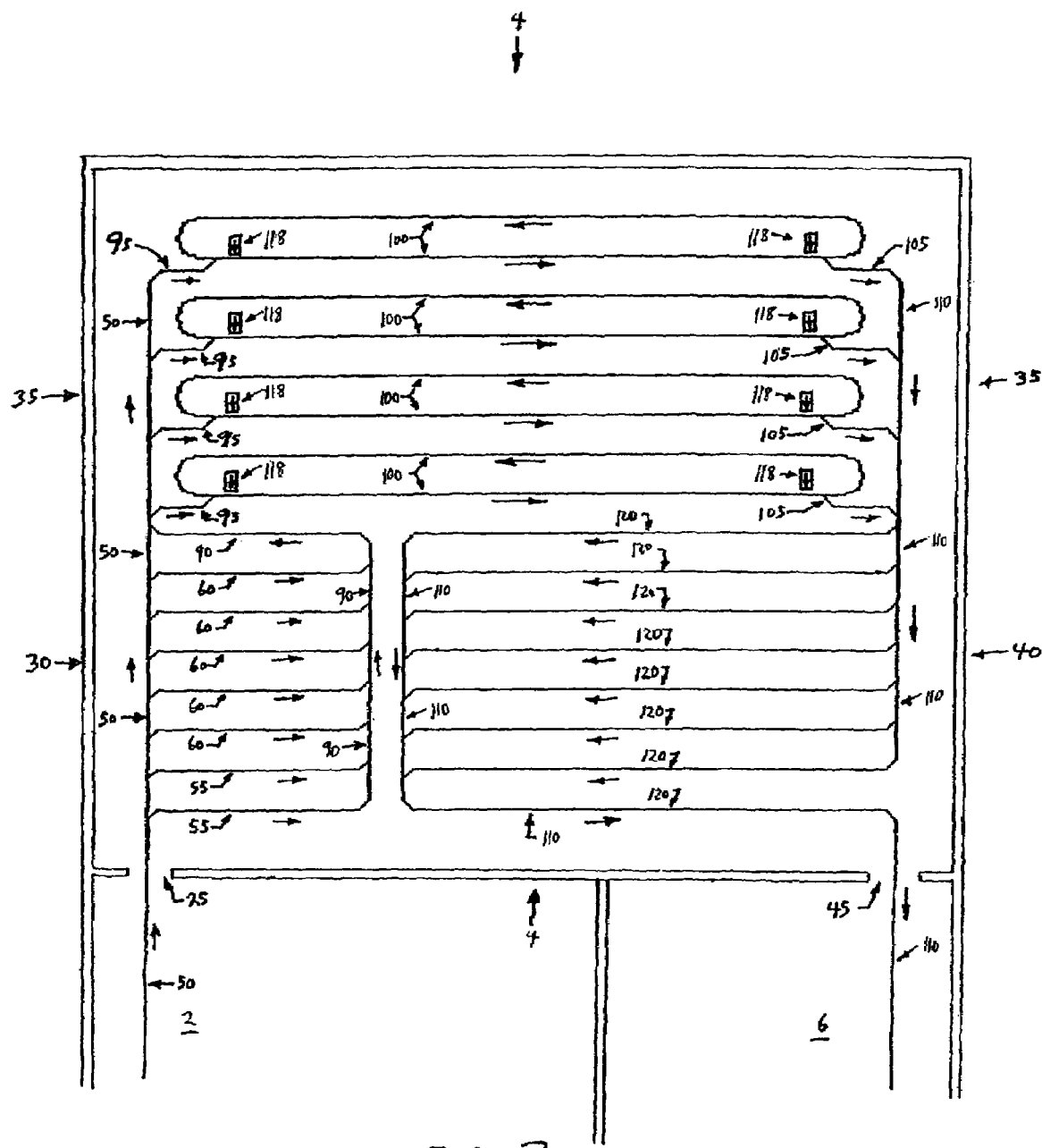
FIG. 3 is a schematic plan view of a carcass conveying and selecting system within a cooler, the system employing storage loops in accordance with an exemplary embodiment of the present invention.

FIG. 3 shows a cooler 4 according to an exemplary embodiment of the invention. The cooler 4 has an entry 25, a regrade/test area 30, a storage area 35, a staging area 40, and an exit 45. Carcasses travel on a feed rail 50 from the kill floor 2 through the entry 25 and into the regrade/test area 30 of the cooler 4. In the regrade/test area 30, parallel rails branch off of the feed rail 50 while the feed rail 50 continues on into the storage area 35. Some parallel rails branching off of the feed rail 50 serve as test rails 55 (e.g., for bacterial or E-coli testing) and other rails serve as regrade rails 60. The ratio of test rails to regrade rails is not critical. Further, one or more of the parallel rails may be other than a regrade rail or a test rail. The test rails 55 and the regrade rails 60 merge into a return rail 90, which in turn merges into the feed rail 50 at a point before the feed rail 50 enters the storage area 35.

In the regrade/test area 30, carcasses to be subjected for testing, e.g. for E-coli or other bacteria, are routed from the feed rail 50 onto one of the test rails 55. Similarly, carcasses that are to be regraded are routed from the feed rail 50 onto one of the regrade rails 60. Carcasses not subject to testing or regrading continue traveling on the feed rail 50 through the regrade/test area 30 to the storage area 35. Carcasses subject to testing or regrading travel to the storage area 35 via the return rail 90 and feed rail 50 after a predetermined period or fulfillment of a condition, e.g., upon completion of their testing or regrading.

The storage area 35 has at least one storage loop 100 forming a continuous loop upon which carcasses may circulate. The storage loop 100 may be thought of as a track, path or route upon which carcasses may travel. As the feed rail 50 enters the storage area 35, loop entry rails 95 branch off of the feed rail 50 and the feed rail 50 eventually terminates as a loop entry rail 95. Each loop entry rail 95 intersects a point on a storage loop 100. At another point on a storage loop 100, a removal rail 105 intersects each storage loop 100. Each removal rail 105 merges into an exit rail 110 before the exit rail 110 leaves the storage area 35 for the staging area 40.

While FIG. 3 illustrates an embodiment having four storage loops 100, other embodiments of the invention incorporate a lesser or greater number of storage loops 100. Further, the functions of the loop entry rail 95 and removal rail 105 may be combined such that each storage loop 100 only intersects a single rail. In another embodiment, the loop entry rail 95 and the removal rail 105 intersect the storage loop 100 at or near the same location on the storage loop 100. Alternately, multiple loop entry rails 96 and removal rails 105 may intersect each storage loop 100. The length of each loop entry rail 96 and removal rail 105 may vary. For example, the loop entry rails 96 and removal rails 105 may be sized to hold a single carcass or may be sized to hold multiple carcasses.

Each storage loop 100 has a rail, or similar conveying device, forming a continuous loop whereon the carcasses 8 may circulate. As a carcass travels along the feed rail 50 within the storage area 35, the carcass may be routed to the storage loop 100 having the greatest available capacity. Thus, the carcass may be routed to the first storage loop having any available capacity. Routing to a storage loop having the greatest available capacity does not require sorting onto a specific storage rail. Alternately, the storage loop 100 to which any given carcass is routed may be determined according to other criteria.

By sending carcasses to the storage loop 100 having the greatest available capacity, all of the storage space within the storage area 35 may be utilized. This is much more efficient than the approximately 60 percent storage space utilization rate typically resulting from systems using parallel storage rails 65.

Figure 4:
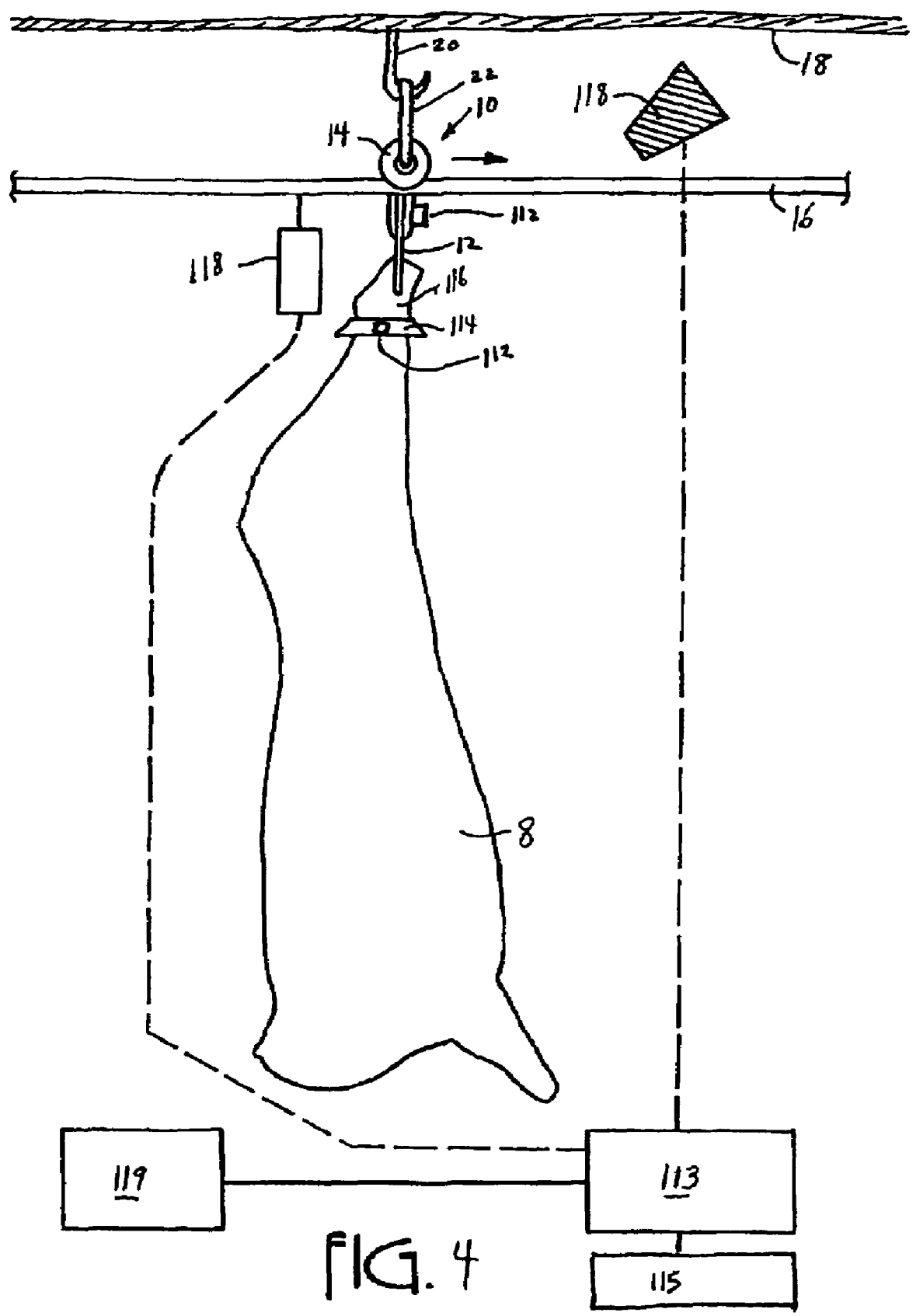
FIG. 4 depicts a carcass tracking and selection system for use with storage loops in accordance with an exemplary embodiment of the present invention.

As depicted in FIG. 4 and explained in U.S. Pat. No. 6,724,309 entitled Method And Apparatus For Tracking Carcasses, filed Nov. 1, 2001 and issued Apr. 20, 2004, each carcass 8, prior to leaving the kill floor 2, may be associated with a readable identification tag 112. The identification tag 112 carries an identification code. As the carcass 8 arrives at various locations within the animal processing facility, its identification tag 112 is read to obtain the identification code. At the same time, information relating to the carcass 8 may be gathered. The information gathered may include, for example, time of slaughter, animal type, carcass weight, grade, rib eye area, projected meat yield, marbling score, and projected subprimal weight. The information and the identification code may be sent to a processor 113 and database 115 for correlation and storage.

As further shown in FIG. 4, the identification tag 112 may be located on the trolley 10 carrying or conveying the carcass 8. The trolley may be a wheel, roller, belt, slide, glide, or other suitable apparatus. The identification tag 112 may alternately be located on a band 114 placed on a limb 116 or other portion of the carcass 8. Of course, any other suitable location for the identification tag may be used. Readers 118 may be provided for reading the identification tag 112 as the carcass travels along the rail 16.

As indicated in FIG. 4, a reader 118 may be located adjacent to or proximate to the rail 16, for example above, below or on the rail 16. The identification tag 112 may be a bar code and the reader 118 may be a bar code reader. Alternately, the identification tag 112 may be a radio-frequency identification ("RFID") tag and the reader 118 may be a radio-frequency ("RF") reader. RFID tags can be passive or active and read-only or read-write. Of course, any suitable tag and reader configuration may be used.

As shown in FIG. 3, located next to each storage loop 100 are one or more readers 118 for reading the identification tag 112 associated with each carcass 8. A reader 118 may be located near the intersection between the storage loop 100 and the loop entry rail 95. Alternately, a reader 118 may be located near the intersection between the storage loop 100 and the removal rail 105. Further, a reader 118 may be located near both intersections. In one embodiment, one or more readers 118 are located at various locations on each storage loop 100.

After entering the staging area 40, staging rails 120 branch off of the exit rail 110. Carcasses may be temporarily stored on the staging rails 120 until called for by the fabrication area 6. The staging rails 120 merge back into the exit rail 110, which is routed out of the staging area 40, through the exit 45 of the cooler 4 and to the fabrication area 6.

Figure 5:
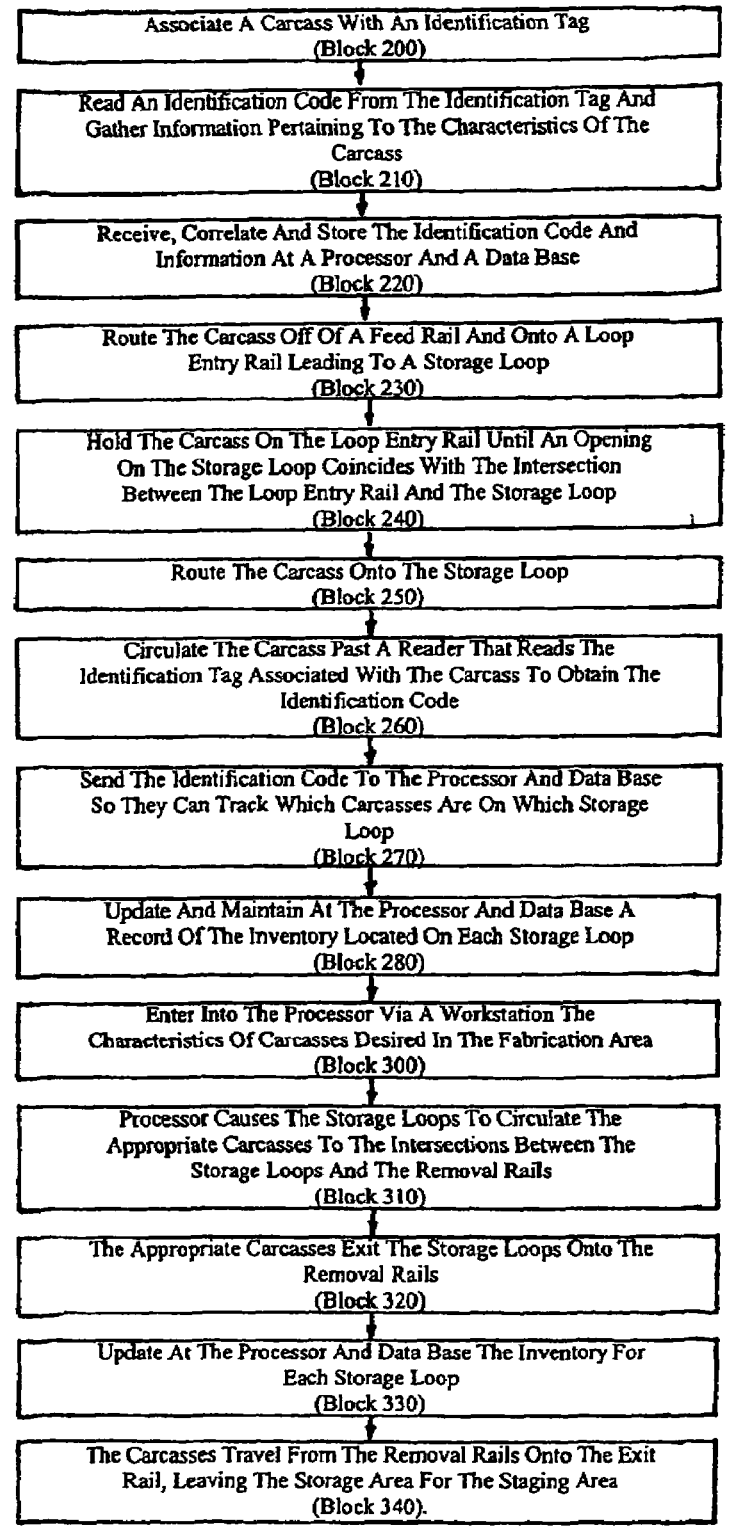
FIG. 5 is a block diagram illustrating a method of storing and selecting carcasses within a storage area having storage loops in accordance with an exemplary embodiment of the present invention.

FIG. 5 is a block diagram illustrating a method of storing and selecting carcasses 8 within a storage area 35, according to one embodiment of the invention. Each carcass 8 is associated with an identification tag 112 (Block 200). A reader 118 reads an identification code from the identification tag 112 and information pertaining to the characteristics of the carcass is gathered (Block 210). The processor 113 and database 115 receive, correlate and store the identification code and information (Block 220).

As a carcass is routed to a storage loop 100 in the storage area 35, it is routed from of the feed rail 50 and onto the loop entry rail 95 leading to the storage loop 100 (Block 230). The carcass is stored at the loop entry rail 95 until an opening on the storage loop 100 coincides with the intersection between the loop entry rail 95 and the storage loop 100 (Block 240). The carcass is routed onto the storage loop 100 (Block 250). The carcass is circulated past a reader 118 that reads the identification tag 112 associated with the carcass 8 (Block 260). The carcasses may be spaced at approximately 16" intervals on the storage loop 100. Alternately, any suitable spacing may be used. The identification code from the identification tag 112 is sent to the processor 113 and database 115 (see FIG. 4) that track which carcasses 8 are on which storage loop 100 (Block 270). The processor 113 and database 115 update and maintain a record of the inventory located on each storage loop 100 (Block 280).

In lieu of identification tags, the carcasses may be inventoried based upon visual characteristics. Thus, to inventory the carcasses on a storage loop, the loop may be cycled one time and the characteristics of the carcasses on the loop recorded.

Because the carcasses are located on a storage loop 100 and tracked by a processor 113 and database 115, an individual carcass meeting specific criteria may be located and pulled off of the storage loop 100 for the fabrication area 6 (or for other purposes such as inspection), regardless of the order in which the carcass entered the storage loop 100. Thus, the storage loops 100 allow carcasses to be selected according to a predetermined number of categories, based on the number of carcass positions available at the facility.

Referring again to FIG. 5, in one embodiment, when the fabrication area 6 requires carcasses 8 meeting specific criteria, the criteria are entered into the processor 113 via a workstation 119 (see FIG. 4) (Block 300). The processor 113 causes the storage loops 100 to circulate the appropriate carcasses to the intersections between the storage loops 100 and the removal rails 105 (see FIG. 3) (Block 310). The appropriate carcasses 8 exit the storage loops 100 onto the removal rails 105 (Block 320). The carcasses 8 travel from the removal rails 105 onto the exit rail 110, leaving the storage area 35 for the staging area 40 (Block 340). The processor 113 and database 115 update the inventory for each storage loop 100 (Block 330).

Embodiments of the invention may be used for meat production of any type of animal, including all age classes of bovine, porcine, ovine, and poultry animals.

Although the invention has been described with reference to preferred embodiments, persons skilled in the art will recognize that changes may be made in form and detail without departing from the spirit and scope of the invention.

We claim:

1. A conveying system for moving carcasses, the system comprising:
   a feed rail configured for conveying carcasses from a kill floor to a cooler;
   a track located within the cooler and configured as a plurality of continuous loops such that carcasses can circulate about the loops; and
   a feed path having a feed end and a cooler end, the feed end of the feed path forming a feed junction with the feed rail and the cooler end of the feed path forming a first junction with a first point on the track, wherein the feed path is configured such that carcasses may travel from the feed path, through the first junction, and onto the track.

2. The conveying system of claim 1, further comprising an exit path having an end, the end of the exit path forming a second junction with a second point on the track, wherein the exit path is configured such that carcasses may travel from the track, through the second junction, and onto the exit path.

3. The conveying system of claim 1, wherein the track comprises a plurality of continuous loops, the end of the feed path forming a first junction with a first point on one of the continuous loops, and wherein the feed path further forms a first junction on each of the remaining plurality of continuous loops by contacting each of the continuous loops at a point before the end of the feed path.

4. The conveying system of claim 3, further comprising an exit path forming a second junction on each of the continuous loops by contacting each of the continuous loops.

5. The conveying system of claim 1, further comprising a reader located near the track and adapted to read identification codes associated with carcasses.

6. The conveying system of claim 5, further comprising a processor and database adapted to receive the identification codes read by the reader.

7. The processor and database of claim 6, wherein the processor and database are adapted to maintain an inventory of carcasses located on the track.

8. The conveying system of claim 1, wherein the track and feed path comprise a system of rails on which trolleys travel, the trolleys being adapted to carry carcasses.

9. The system of claim 1, wherein the carcass is bovine.

10. The system of claim 1, wherein the carcass is porcine.

11. The system of claim 1, wherein the carcass is ovine.

12. The system of claim 1, wherein the carcass is poultry.

13. A system for transporting carcasses in a cooler, the system comprising a first path forming a continuous loop along which carcasses may circulate and a second path having an end that forms a first junction with a first point on the continuous loop, the second path being configured such that carcasses may travel from the second path to the continuous loop via the first junction; and
    a radio frequency identification tag associated with each carcass, the radio frequency identification tag being used to enable choosing a selected carcass based on a desired characteristic.

14. The system of claim 13, further comprising a third path having an end that forms a second junction with a second point on the continuous loop, the third path being configured such that carcasses may travel from the continuous ioop to the third path via the second junction.

15. The system of claim 14, wherein the paths comprise a system of rails on which trolleys travel, the trolleys adapted to carry carcasses.

16. The system of claim 13, further comprising a reader located near the continuous loop and adapted to read identification codes stored in the radio frequency identification tag.

17. The system of claim 16, further comprising a processor and database adapted to receive the identification codes read by the reader.

18. The system of claim 17, wherein the processor and database are adapted to maintain an inventory of carcasses located on the continuous loop.

19. The system of claim 13, wherein the radio frequency identification tag stores one or more characteristics of the carcass.

20. The system of claim 19, wherein the one or more characteristic is time of slaughter.

21. The system of claim 19, wherein the one or more characteristic is animal type.

22. The system of claim 19, wherein the one or more characteristic is carcass weight.

23. The system of claim 19, wherein the one or more characteristic is grade.

24. The system of claim 19, wherein the one or more characteristic is rib eye area.

25. The system of claim 19, wherein the one or more characteristic is projected meat yield.

26. The system of claim 19, wherein the one or more characteristic is marbling score.

27. The system of claim 19, wherein the one or more characteristic is projected subprimal weight.

\* \* \* \* \*